(12) United States Patent
Diehl et al.

(10) Patent No.: US 8,071,655 B2
(45) Date of Patent: Dec. 6, 2011

(54) COBALT-BASED CATALYST FOR FISCHER-TROPSCH SYNTHESIS

(75) Inventors: Fabrice Diehl, Lyons (FR); François Hugues, Vernaison (FR); Marie-Claire Marion, Vernaison (FR); Denis Uzio, Belleville (FR)

(73) Assignees: IFP Energies Nouvelles, Rueil Malmaison Cedex (FR); ENI S.p.A., Rome (IT)

( * ) Notice: Subject to any disclaimer, the term of this patent is extended or adjusted under 35 U.S.C. 154(b) by 536 days.

(21) Appl. No.: 11/721,923

(22) PCT Filed: Nov. 17, 2005

(86) PCT No.: PCT/FR2005/002863
§ 371 (c)(1),
(2), (4) Date: Oct. 5, 2009

(87) PCT Pub. No.: WO2006/067285
PCT Pub. Date: Jun. 29, 2006

(65) Prior Publication Data
US 2010/0029792 A1 Feb. 4, 2010

(30) Foreign Application Priority Data

Dec. 17, 2004 (FR) ................................ 04 13545
Oct. 26, 2005 (FR) ................................ 05 11014

(51) Int. Cl.
*C07C 27/00* (2006.01)
*B01J 23/00* (2006.01)
*B01J 21/00* (2006.01)
*B01J 20/00* (2006.01)

(52) U.S. Cl. ........ 518/715; 502/242; 502/243; 502/244; 502/245; 502/251; 502/252; 502/253; 502/258; 502/259; 502/260; 502/261; 502/263; 502/305; 502/326; 502/327; 502/328; 502/329; 502/330; 502/331; 502/332; 502/335; 502/336; 502/337; 502/338; 502/340; 502/341; 502/342; 502/343; 502/344; 502/345; 502/346; 502/352; 502/355; 502/407; 502/415; 502/439; 502/524

(58) Field of Classification Search ............... 502/242, 502/243, 244, 245, 251, 252, 253, 258, 259, 502/260, 261, 263, 305, 326, 327, 328, 329, 502/330, 331, 332, 335, 336, 337, 338, 340, 502/341, 342, 343, 344, 345, 346, 352, 355, 502/407, 415, 439, 524; 518/715
See application file for complete search history.

(56) References Cited

U.S. PATENT DOCUMENTS

| | | | | |
|---|---|---|---|---|
| 3,751,508 A * | 8/1973 | Fujiso et al. | ................... | 585/262 |
| 3,909,455 A | 9/1975 | Rainer et al. | | |
| 4,261,862 A * | 4/1981 | Kinoshita et al. | ............. | 502/304 |
| 4,263,020 A * | 4/1981 | Eberly, Jr. | ........................ | 95/136 |
| 4,274,981 A * | 6/1981 | Suzuki et al. | ................ | 502/178 |
| 4,419,274 A * | 12/1983 | Sin et al. | ........................ | 502/304 |
| 4,425,312 A * | 1/1984 | Brignac | ........................ | 423/230 |
| 4,497,903 A | 2/1985 | Kibby et al. | | |
| 4,690,806 A * | 9/1987 | Schorfheide | ................... | 423/230 |
| 4,749,672 A * | 6/1988 | Lussier et al. | ................... | 502/68 |
| 4,801,620 A | 1/1989 | Fujitani et al. | | |
| 5,352,337 A * | 10/1994 | Kobayashi et al. | ............ | 205/617 |
| 5,395,406 A * | 3/1995 | Clavenna et al. | ............. | 48/198.7 |
| 5,846,891 A * | 12/1998 | Son et al. | ........................ | 501/127 |
| 6,340,379 B1* | 1/2002 | Penth et al. | ........................ | 95/45 |
| 6,372,688 B1* | 4/2002 | Yamashita et al. | ............ | 502/326 |
| 6,428,761 B1* | 8/2002 | Shore et al. | ............... | 423/244.01 |
| 6,524,996 B1* | 2/2003 | Bender et al. | ................... | 502/346 |
| 6,638,599 B2* | 10/2003 | Masaki et al. | ................. | 428/141 |
| 6,638,889 B1 | 10/2003 | Van Berge et al. | | |
| 6,846,471 B2* | 1/2005 | Hotta et al. | ................. | 423/239.1 |
| 6,913,739 B2* | 7/2005 | Shore et al. | ..................... | 423/247 |
| 2002/0028171 A1* | 3/2002 | Goetsch et al. | ................ | 423/237 |
| 2002/0041842 A1* | 4/2002 | Ruettinger et al. | ........... | 423/230 |
| 2005/0037244 A1* | 2/2005 | Goetsch et al. | ................. | 429/17 |
| 2006/0008401 A1 | 1/2006 | Hotta et al. | | |

FOREIGN PATENT DOCUMENTS

| | | |
|---|---|---|
| EP | 1 233 011 A1 | 8/2002 |
| WO | WO 99/42214 A1 | 8/1999 |
| WO | WO 02/068117 A1 | 9/2002 |

OTHER PUBLICATIONS

International Search Report of PCT/FR2005/002863 (Mar. 28, 2006).
Written Opinion of the International Searching Authority of PCT/FR2005/002863.

* cited by examiner

*Primary Examiner* — Cam N. Nguyen
(74) *Attorney, Agent, or Firm* — Millen, White, Zelano & Branigan, P.C.

(57) ABSTRACT

A catalyst applicable to the synthesis gas conversions especially E-T slurry processes, said catalyst comprising: a) a support containing at least a first aluminate element of mixed spinel structure of formula $M_xM'_{(1-x)}Al2O4/Al2O3.SiO2$, x ranging between and excluding 0 and 1, or of simple spinel structure of formula $MAl2O4/Al2O3.SiO2$, said support being calcined in an at least partly oxidizing atmosphere, at a temperature ranging between 850° C. and 900° C., and b) an active phase deposited on said support, which contains one or more group VIII metals, selected from among cobalt, nickel, ruthenium or iron. Said catalyst is used in a fixed bed or suspended in a three-phase reactor for hydrocarbon synthesis from a CO, $H_2$ mixture.

32 Claims, No Drawings

COBALT-BASED CATALYST FOR FISCHER-TROPSCH SYNTHESIS

FIELD OF THE INVENTION

The field of the invention is the field of Fischer-Tropsch synthesis processes allowing to obtain a wide range of hydrocarbon cuts from the CO, $H_2$ mixture (carbon monoxide and hydrogen) commonly referred to as synthesis gas.

The catalysts used in this type of reaction are in most cases supported catalysts based on alumina or silica-alumina, the active phase consisting of iron (Fe) or cobalt (Co).

The present invention describes a new type of catalyst which, by its structure, allows higher attrition resistance, therefore reduces problems linked with separation of the effluents likely to contain a certain proportion of fine catalyst particles and reduces the risk of contamination of the catalysts used in downstream units.

Synthesis gas is a mixture of carbon monoxide and of hydrogen having $H_2/CO$ molar ratios that can range from 0.5 to 4 according to the process from which it was obtained:
  from the hydrocarbon or alcohol steam reforming process, the $H_2/CO$ ratio of the synthesis gas is generally close to 3,
  from a partial oxidation process, the $H_2/CO$ ratio of the synthesis gas is rather close to 1.5 to 2,
  from a thermal reforming process, the $H_2/CO$ ratio of the synthesis gas is generally close to 2.5,
  from a $CO_2$ gasification and reforming process, the $H_2/CO$ ratio of the synthesis gas is generally close to 1.

Synthesis gas is notably used in Fischer-Tropsch synthesis for the production of higher hydrocarbons (C5+), essentially linear and saturated, containing at least 50% by weight of C5+ hydrocarbons in relation to all of the products formed.

The simplified stoichiometric equation of the Fischer-Tropsch synthesis is written as follows:

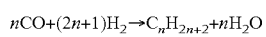

$$nCO+(2n+1)H_2 \rightarrow C_nH_{2n+2}+nH_2O$$

This reaction is generally carried out at medium or high temperature and under pressure.

It is known to the man skilled in the art for being catalysed by group VIII metals such as cobalt, nickel, ruthenium or iron.

The Fischer-Tropsch synthesis reaction can be carried out in various reactor types (fixed, moving or three-phase (gas, liquid, solid) bed, for example of perfectly stirred autoclave type, or bubble column), and the reaction products notably have the characteristic of being free of sulfur or nitrogen compounds, or of aromatic type.

Fischer-Tropsch synthesis reaction products can be upgraded by subsequent chemical conversions or separations. Thus, the C5-C15 cut can be distilled and the corresponding hydrocarbons used as solvents. Hydrotreating can also allow the purity of these products to be increased by removing olefin traces.

Conversion processes such as hydrocracking, dewaxing or hydroisomerization of heavier cuts (C16+) allow to produce various fuel types in the middle distillates range: gas oil (180-370° C. cut), kerosine (140-300° C. cut).

What is referred to as slurry in the context of the invention is a use of the catalyst characterized by the fact that it is divided into a very fine powder, typically of the order of some ten microns, this powder forming a suspension with the reaction medium. The term slurry, well known to the man skilled in the art, is used in the text hereafter to designate the type of use defined above.

When used in Fischer-Tropsch synthesis processes, notably in slurry type processes, in the sense defined above, the catalyst is subjected to particularly severe conditions in terms of mechanical and chemical attrition.

In fact, the very high linear velocities encountered in slurry processes generate inter-particle impacts or impacts against equipment walls, which can lead to the formation of fines.

What is referred to as fines are particles less than 10 microns in diameter, possibly less than 1 micron, in which case one refers to submicronic particles. These fine particles are particularly difficult to separate from the reaction effluents and they can contaminate the catalysts used in downstream processes.

In addition to these mechanical stresses, the solid works under harsh hydrothermal conditions, i.e. under steam partial pressures (water being a fatal coproduct of the reaction) ranging from some tenths of a MPa to values above 1 MPa according to the carbon monoxide conversion rate.

Under such conditions, the use of alumina-based or silica-based supports can entail risks linked with the rehydration phenomenon inherent in the reaction conditions, essentially defined by the water temperature/partial pressure pair.

This rehydration phenomenon, notably described in J. P. Franck's work *Chem Communications* No. 1,071,984, chemically alters the support and leads to the formation of hydrated compounds of boehmite or kaolinite type according to the initial material.

When a three-phase reactor (slurry reactor) is used, this chemical alteration, combined with the severe hydrodynamic conditions described above, leads to a marked attrition.

One of the most efficient means of reducing the extent of this rehydration phenomenon is to change the composition of the support, either by limiting said change to the surface of the support, or by changing also the composition and the volume structure of this support.

BACKGROUND OF THE INVENTION

Considerable work has therefore been done in order to stabilize the support with regard to these support rehydration and/or redissolution processes.
  It is thus taught in patent WO-99/42,214 that the introduction of elements selected from among: Si, Zr, Cu, Zn, Mn, Ba, Co, Ni, La allows to substantially limit the support rehydration/dissolution process in acid or neutral aqueous media.
  A preferred way of modifying the support consists in grafting at the surface of said support organic Si compounds of TEOS (TetraEthylOrthoSilicate) or TMOS (TriMethOxySilane) type.
  Patent WO-02/07,883 teaches that modification of a Fischer-Tropsch synthesis catalyst support by impregnation of an organometallic compound of formula $Me(OR)_x$ with x ranging from 1 to 5, Me being a metal selected from among the following elements: Si, Zr, Cu, Zn, Mn, Ba, Co, Ni, Na, K, Ca, Sn, Cr, Fe, Li, Tl, Mg, Sr, Ga, Sb, A, Hf, Th, Ce, Ge, U, Nb, Ta, W, and R designating an alkyl or acyl group, allows to limit the formation of crystallized phases responsible for the activity loss of the catalyst under the operating conditions of the Fischer-Tropsch synthesis.
  The organometallic compound can possibly be decomposed by calcination after deposition of the active phase by impregnation. The major drawback of this preparation mode is the use of an organic solvent intended to solubilize the organometallic compound prior to the deposition thereof by impregnation.
  Patents U.S. Pat. No. 5,169,821 and U.S. Pat. No. 5,397, 806 teach that the introduction of silicon, zirconium or tantalum in a cobalt-based catalyst supported on titanium oxide of anatase type should allow to obtain a stabilizing effect towards a high-temperature regenerative treatment.

Mechanical stabilization towards the severe attrition conditions that prevail when using a slurry can also be obtained by adding silica ($SiO_2$) and alumina ($Al_2O_3$) to an initial titanium oxide ($TiO_2$) phase as described in patent WO-99/39,825.

The use of phases of spinel structure $MAl_2O_4$ in catalysis (hydrocarbon steam reforming, partial oxidation, water dealkylation) is generally justified by the particular surface properties of these solids, and their excellent textural and mechanical stability in the high temperature range required for these applications (for example in methane reforming for the production of synthesis gas as described by Xu Z, Li Y, Zhang J, Chang L, Zhou R, Duan Z in *Applied Catal A General*, (2001), 213(1), 65-71.

Simple ($AB_2O_4$) or mixed ($A_xA'_{1-x}B_2O_4$) spinels are synthesized by bringing metal oxide mixtures obtained by coprecipitation of metallic precursors to high temperature.

In Fischer-Tropsch synthesis, the use of simple spinel type supports is described by Kondo S, Muraki H, Fujitanii Y in *Sekiyu Gakkaishi* (1984) 27 (6), 556-563. The use of $MgAl_2O_4$ allows to obtain, under test conditions (fixed bed), more active catalysts than on various transition aluminas ($\gamma$, $\delta$, $\alpha$).

The presence of silicon, notably in silica-alumina form, in the support is however not mentioned by any of these authors.

SUMMARY OF THE INVENTION

The invention thus relates to a catalyst intended for hydrocarbon synthesis from a mixture comprising carbon monoxide and hydrogen (a synthesis known as Fischer-Tropsch), said catalyst comprising:

a support consisting of a mixed spinel structure of formula $M_xM'_{(1-x)}Al_2O_4/Al_2O_3 SiO_2$ or of a simple spinel structure of formula $MAl_2O_4/Al_2O_3.SiO_2$ wherein M and M' are distinct metals selected from the group made up of: magnesium (Mg), copper (Cu), cobalt (Co), nickel (Ni), tin (Sn), zinc (Zn), lithium (Li), calcium (Ca), cesium (Cs) and sodium (Na), the value of index x ranging between 0 and 1 (values 0 and 1 being excluded), and $Al_2O_3 SiO_2$ designating the chemical formula of a silica-alumina, and an active phase deposited on said support, which contains one or more group VIII metals, selected among cobalt (Co), nickel (Ni), ruthenium (Ru) or iron (Fe), preferably cobalt or iron, and more preferably cobalt.

In cases where the active phase consists of Co, Ni or Fe, the proportions of metals Co, Ni and Fe are generally selected between 1 and 60 wt %, preferably between 5 and 30 wt % and, if the active phase is ruthenium, the ruthenium content generally ranges between 0.01 and 10 wt %, preferably between 0.05 and 5 wt %.

The support of the catalyst according to the invention is calcined in an at least partly oxidizing atmosphere, at a temperature ranging between 700° C. and 1100° C., preferably between 740° C. and 1030° C., and more preferably between 850° C. and 900° C.

The silica-alumina involved in the support of the catalyst according to the invention generally contains between 1 and 30 wt % silica in relation to the anhydrous product.

The group VIII metal involved in the active phase of the catalyst according to the invention preferably is cobalt.

The active phase of the catalyst according to the invention can also contain at least one additional element selected from the group consisting of ruthenium, molybdenum, tantalum, platinum, palladium and rhenium, preferably ruthenium or rhenium.

DETAILED DESCRIPTION

The invention thus relates to a catalyst for Fischer-Tropsch synthesis whose support has a simple or mixed spinel structure, and to a method of preparing such a catalyst.

It has been shown that the use of a mixed $M_xM'_{(1-x)}Al_2O_4/Al_2O_3.SiO_2$, or simple $MAl_2O_4/Al_2O_3.SiO_2$ spinel allows to considerably increase the hydrothermal resistance of supports while keeping a high level of catalytic performances in terms of activity, stability and selectivity under the Fischer-Tropsch synthesis conditions. These catalysts according to the invention thus allow to obtain high catalytic performances (C5+hydrocarbons conversion and selectivity, i.e. hydrocarbons having at least five carbon atoms), while limiting risks of deactivation with time thanks to a high mechanical strength and hydrothermal resistance.

The catalyst according to the present invention comprises:

a) a support consisting of a mixed spinal structure of formula $M_xM'_{(1-x)}Al_2O_4/Al_2O_3.SiO_2$ or of a simple spinel structure of formula $MAl_2O_4Al_2O_3.SiO_2$. wherein M and M' are distinct metals selected from the group made up of: magnesium (Mg), copper (Cu), cobalt (Co), nickel (Ni), tin (Sn), zinc (Zn), lithium (Li), calcium (Ca), cesium (Cs), sodium (Na), iron (Fe) and manganese (Mn). In the case of iron or manganese, a perovskite type structure is obtained, x ranging between 0 and 1, values 0 and 1 themselves being excluded. More preferably, M is cobalt in the case of a simple spinel, M is cobalt and M' is magnesium or zinc in the case of a mixed spinel. More preferably, M' is magnesium, and b) an active phase deposited on said support, which contains one or more group VIII metals, selected from among cobalt (Co), nickel (Ni), ruthenium (Ru) or iron (Fe). In the case of metals Co, Ni and Fe, the proportions can be selected between 1 and 60 wt %, preferably between 5 and 30 wt %. In the case of ruthenium, a range from 0.01 to 10 wt %, preferably from 0.05 to 5 wt %, is preferably used.

The support of the catalyst according to the invention comprises at least 5 wt % of said spinel structure, preferably at least 10 wt %, and more preferably at least 15 wt %.

It can possibly consist about 100% of said spinel structure.

The catalyst is preferably used in a three-phase fluidized reactor of perfectly stirred autoclave type, or in a bubble column. The use of a fixed bed can also be considered.

The initial support preferably is a silica-alumina whose alumina part is a transition alumina consisting of at least one phase of crystallographic structure $\delta$, $\gamma$, $\theta$ or $\alpha$.

The morphology of the support can be of ball, extrudate (for example in trilobe form) or pellet type for use in a fixed-bed type reactor, or of powder type of variable grain size for use in a slurry type reactor.

The invention is not limited to a particular use of the catalyst, it is on the contrary compatible with any usual type of use in Fischer-Tropsch synthesis, i.e. use in a perfectly stirred autoclave type reactor, or in an ebullating bed, or in a fixed or moving bed.

The grain size can therefore range between some microns and some hundred microns. Typically, for use in a slurry three-phase reactor, the size of the catalyst particles ranges between 10 microns and 500 microns, preferably between 10 microns and 300 microns, more preferably between 20 microns and 150 microns, and most preferably between 20 microns and 120 microns.

The support can comprise, in addition to alumina, at least one oxide selected from the group consisting of silica, silica-alumina, cerine, zirconia, or any combination of at least two of these oxides.

The preferred support according to the invention is a silica-alumina in a proportion ranging between 0.5 and 30 mass % silica in relation to the anhydrous product. Preferably, this silica-alumina is homogeneous on a micrometric scale, and more preferably on a nanometric scale.

preferred method of preparing the catalyst for Fischer-Tropsch synthesis according to the invention is as follows:

in a first stage, a silica-alumina is dry impregnated by an aqueous solution of a salt of a metal M or M', the solid thus impregnated is then dried at a temperature ranging between 60° C. and 200° C. for a time period ranging from half an hour to three hours, then calcined at a temperature ranging between 300° C. and 600° C. in dry air for a time period ranging from half an hour to three hours, then at a temperature ranging between 700° C. and 1100° C. for a time period ranging from one hour to 24 hours, preferably from 2 hours to 5 hours, the solid obtained containing at least 5 wt % of the spinel structure comprising cobalt, preferably at least 10 wt %, and more preferably at least 15 wt %, in a second stage, said solid is again impregnated by an aqueous or organic solution, preferably aqueous, of a salt of a group VIII metal, then dried at a temperature ranging between 60° C. and 200° C. for a time period ranging from half an hour to three hours, then calcined in dry air at a temperature ranging between 700° C. and 1100° C. for a time period ranging between one hour and 24 hours, the final solid thus obtained containing 1 to 60 wt % cobalt, preferably 5 to 30 wt %.

It is also possible to carry out a third stage of impregnation by a salt of a group VIII metal and to split the first stage into 2 separate impregnation stages of metals M and M'.

Any method allowing to obtain said support, modified by the addition of at least one element M to obtain the simple spinel structure and of at least one element M' to obtain the mixed spinel structure, belongs to the invention. The catalyst according to the invention can therefore be of simple or of mixed spinel structure.

Without this list being considered to be exhaustive, it is possible to impregnate like below a preformed or powder alumina support with at least one aqueous solution containing the hydrosoluble precursors of the elements selected, and to carry out washing, drying and calcining stages.

Similarly, it is possible to prepare said support by coprecipitation of an aqueous solution containing metals Al, M and M', in nitrate form for example, by an aqueous alkaline carbonate or hydrogencarbonate solution, followed by washing, drying and calcining.

It is also possible to prepare said support by means of the sol-gel process, or by complexing of said aqueous solution containing metals Al, M and M' by at least one alpha-alcohol acid added in a proportion of 0.5 to 2 moles acid per mole of metals, followed by vacuum drying leading to a homogeneous vitrous substance, then calcining.

The catalyst thus prepared is preferably subjected to a thermal treatment intended to convert precursors M and M' and the alumina to a spinel type structure (M and M' aluminate).

This thermal treatment is generally carried out in an oxidizing atmosphere (air or $O_2$) at high temperature, generally between 700° C. and 1100° C., preferably between 740° C. and 1030° C., and more preferably between 850° C. and 900° C., or at least partly under nitrogen, or under oxygen-depleted air.

By way of example, it is possible to deposit the group VIII active metal by means of the dry impregnation technique consisting in contacting the porous support with a solution whose volume is equal to the pore volume of the support to be impregnated. This solution contains the metallic precursors of the group VIII metal(s) (chloride, nitrate, acetate, . . . ) at the desired concentration. Impregnation of said active metal can be carried out in one or more impregnation stages. In the case of relatively high metal contents, two-stage or even three-stage impregnation is preferred. These impregnation stages come in addition to the elements M and M' addition stages. Between each stage, at least one additional drying and/or calcining and/or reduction stage is preferably carried out. It may be very advantageous to deposit on the catalyst a small amount of at least one metal selected from among metals Pt, Pd, Rh, Ru, Re in order to facilitate reduction of the group VIII active metal.

Prior to its use in the catalytic reactor, the catalyst is subjected to a reducing treatment, for example under pure or diluted hydrogen, at high temperature, to activate the catalyst and to form metal particles in the zero-valent state.

This treatment can be carried out in situ (in the same reactor as the reactor used for the Fischer-Tropsch reaction), or ex situ prior to being fed into the reactor.

EXAMPLES

In the examples hereafter, 5 catalysts according to the prior art, denoted by A, B, C, D and G are compared with two catalysts according to the invention denoted by E and F and having a simple spinel structure.

Comparison is performed according to a hydrothermal resistance criterion, a mechanical strength criterion and a chemical activity criterion.

It results from this comparison that catalysts E and F according to the invention afford the best compromise between hydrothermal resistance, mechanical strength and chemical activity.

Example 1

Preparation of Catalyst a of Formula $Co/Al_2O_3$
(Comparative)

A catalyst A consisting of cobalt on alumina is prepared by dry impregnation of an aqueous cobalt nitrate solution on a powdered alumina (average grain size-90 μm) having a specific surface of 170 $m^2$/gram.

After 12-hour drying under static conditions at 120° C., the solid is calcined for 2 hours at 450° C. in an air stream in a traversed-bed type reactor. Final catalyst A contains 9.2 wt % cobalt.

Example 2

Preparation of Catalyst B of Formula $Co/Al_2O_3SiO_2$
(Comparative)

A catalyst B based on cobalt on silica-alumina is prepared by dry impregnation according to the same procedure as for catalyst A.

The support used contains 5 wt % $SiO_2$ and 95 wt % alumina ($Al_2O_3$). Its specific surface is 180 $m^2$/g.

After thermal activation, catalyst B contains 10 wt % cobalt.

Example 3

Preparation of Catalyst C of Formula Co/CoAl$_2$O$_4$—Al$_2$O$_3$.SiO$_2$ (Comparative)

A catalyst C is prepared by dry impregnation of a cobalt nitrate solution, followed by high-temperature calcination (800° C.) for 4 hours under air.

The initial support is the silica-alumina used for catalyst B.

The support thus modified contains 5 wt % cobalt included in the support in form of cobalt aluminate (CoAl$_2$O$_4$).

A new stage of cobalt deposition by dry impregnation is carried out according to the same protocol as for catalyst A.

Final catalyst C contains 15.4 wt % cobalt, of which 10.4% in form of cobalt oxide Co$_3$O$_4$.

Example 4

Preparation of catalyst D of formula Co/Al$_2$O$_3$.SiO$_2$ ex TEOS (comparative)

The support of catalyst A is impregnated at reflux for 4 hours by an alcoholic solution (ethanol) of Tetra Ethyl Ortho Silicate (TEOS).

After vacuum drying and calcination for 12 hours at 400° C., the support thus modified, containing 7.4 wt % SiO$_2$, is impregnated by an aqueous cobalt nitrate solution according to the same protocol as in example 1.

Final catalyst D contains 10.1 wt % cobalt.

Preparation of catalyst D is carried out from the publication by S. Barrada, E. A. Caricato, P. J. van Berge and J. Van de Loosdrecht in *Studies in Surface Science and Catalysis*, (2002), 143, pp. 55-65.

Example 5

Preparation of Catalyst E of Formula Co/CoAl$_2$O$_4$—Al$_2$O$_3$.SiO$_2$ (According to the Invention)

A catalyst E is prepared according to the procedure used for catalyst C, but the high-temperature calcination temperature after the first impregnation stage is 850° C. instead of 800° C. Final catalyst E contains 15.4 wt % cobalt, of which 10.4% in Co$_3$O$_4$ form.

Example 6

Preparation of Catalyst F of Formula Co/CoAl$_2$O$_4$—Al$_2$O$_3$.SiO$_2$ (According to the Invention)

A catalyst F is prepared according to the procedure used for catalyst C, but the high-temperature calcination temperature after the first impregnation stage is 900° C. instead of 800° C. Final catalyst F contains 15.4 wt % cobalt, of which 10.4% in Co$_3$O$_4$ form.

Example 7

Preparation of Catalyst G of Formula Co/CoAl$_2$O$_4$—Al$_2$O$_3$.SiO$_2$ (Comparative)

A catalyst G is prepared according to the procedure used for catalyst C, but the high-temperature calcination temperature after the first impregnation stage is 950° C. instead of 800° C. Final catalyst C contains 15.4 wt % cobalt, of which 10.4% in Co$_3$O$_4$ form.

Example 8

Hydrothermal Resistance Characterization

Characterization of the hydrothermal resistance is achieved by contacting 2 grams of each one of the catalysts studied with a mixture of water, heptane, pentane (17 wt %/48 wt %/35 wt % respectively) at 200° C. for 300 hours in an autoclave in static mode under autogenous pressure.

After drying, the product is finally analyzed by thermogravimetry (TGA) coupled with an infrared analyzer and a mass spectrometer so as to determine the nature of the degassed products.

An X-ray diffraction analysis is also carried out to determine the mass proportion of hydrated product, essentially of boehmite type.

The results are shown in the table hereunder:

| | Mass % of boehmite XRD | % loss on heating 200° C. < T < 500° C. |
|---|---|---|
| A (comparative) | 81.0 | 32 |
| B (comparative) | 17.0 | 13 |
| C (comparative) | 5.0 | 6 |
| D (comparative) | 1.0 | 3 |
| E (according to the invention) | 3.5 | 4.5 |
| F (according to the invention) | 3.0 | 4 |
| G (comparative) | 3.0 | 4 |

The loss on heating observed between 200° C. and 500° C. corresponds to the escape of water and of carbon dioxide, as shown by the infrared detector and the mass spectrometer coupled with the thermogravimetry device.

Example 9

Characterization of the Catalyst Mechanical Strength

After 500-hour testing, the mechanical strength of catalysts A to G was evaluated by measuring the grain size obtained after separation of the reaction products. The table hereunder gives the percentage of catalyst particles of size below 20 μm, formed while testing the seven catalysts. This value is representative of the attrition resistance of the catalysts.

| Catalyst | % particles below 20 μm |
|---|---|
| A (comparative) | 15 |
| B (comparative) | 8 |
| C (comparative) | 4 |
| D (comparative) | 3 |
| E (according to the invention) | 2.7 |
| F (according to the invention) | 2.4 |
| G (comparative) | 2.9 |

Catalysts E and F (according to the invention) have a much higher mechanical strength than catalysts A and B, and equivalent to that of catalysts C, D and G.

Example 10

Characterization of the Catalytic Performances in a Slurry Type Autoclave

Catalysts A to G described above are tested in a slurry type three-phase reactor, perfectly stirred, working on a continuous basis, and operated at a concentration of 10% mole catalyst in the three-phase system.

The catalyst is in powder form of diameter ranging between 40 and 150 microns.

The test conditions are as follows:
Temperature=230° C.
Pressure=2 MPa
LHSV=1000 h$^{-1}$
H$_2$/CO molar ratio=2/1.

| Catalyst | CO conversion (vol %) after 120 h | Distribution of the products formed (wt %) | |
|---|---|---|---|
| | | C1 [a] | C5+ [b] |
| A (comparative) | 55 | 9.0 | 79.0 |
| B (comparative) | 54 | 12.0 | 75.0 |
| C (comparative) | 55 | 10.0 | 80.0 |
| D (comparative) | 55 | 14.0 | 72.0 |
| E (according to the invention) | 56 | 9.3 | 81.0 |
| F (according to the invention) | 56 | 9.0 | 82.0 |
| G (comparative) | 54 | 11.0 | 78.0 |

[a] methane
[b] hydrocarbons having at least five carbon atoms.

The results show that catalysts E and F according to the invention have better C5+ hydrocarbon selectivities than the catalysts that are not prepared according to the invention, Catalysts E and F also lead to significantly lower methane selectivities than catalysts A, B, C, D and C that are not prepared according to the invention.

They therefore afford the best compromise between chemical activity, hydrothermal resistance and mechanical strength towards attrition.

The invention claimed is:

1. A catalyst comprising:
    a support comprising a mixed spinel structure of formula M$_x$M'$_{(1-x)}$Al$_2$O$_4$/Al$_2$O$_3$.SiO$_2$ or a simple spinel structure of formula MAl$_2$O$_4$/Al$_2$O$_3$.SiO$_2$, wherein M and M' are distinct metals each selected among: magnesium, copper, cobalt, nickel, tin, zinc, lithium, calcium, cesium and sodium, the value of index x ranging between 0 and 1 with the values of 0 and 1 being excluded, and Al$_2$O$_3$ SiO$_2$ designating a silica-alumina, wherein the silica-alumina is homogeneous on a micrometric scale, said support having been calcined in an at least partly oxidizing atmosphere, at a temperature ranging between 850° C. and 900° C., and
    an active phase deposited on said support, which contains one or more group VIII metals, selected among cobalt, nickel, ruthenium and iron.

2. A catalyst as claimed in claim 1, wherein: said active phase comprises cobalt, nickel or iron in a proportion of between 1 and 60 wt %; or said active phase comprises ruthenium in a proportion of between 0.01 and 10 wt %.

3. A catalyst according to claim 2, wherein the active phase comprises cobalt, nickel or iron in a proportion of between 5 and 30 wt %.

4. A catalyst according to claim 2, wherein the active phase comprises ruthenium in a proportion of between 0.01 and 10 wt %.

5. A catalyst as claimed in claim 2, wherein said active phase comprises cobalt, nickel or iron in a proportion of between 1 and 60 wt %.

6. A catalyst as claimed in claim 2, wherein said active phase comprises ruthenium in a proportion of between 0.01 and 10 wt %.

7. A catalyst as claimed in claim 1, wherein the silica-alumina contains between 1 and 30 wt % of silica on an anhydrous basis.

8. A catalyst according to claim 7, wherein the silica-alumina is homogeneous on a nanometric scale.

9. A catalyst as claimed in claim 1, wherein the group VIII metal is cobalt.

10. A catalyst as claimed in claim 9, wherein the active phase contains at least one additional element selected among ruthenium, molybdenum, tantalum, platinum, palladium and rhenium.

11. A catalyst as claimed in claim 10, wherein said additional element is ruthenium or rhenium.

12. A catalyst as claimed in claim 1, wherein said support comprises said mixed spinel structure, M is cobalt, and M' is magnesium or zinc.

13. A catalyst as claimed in claim 1, wherein said support comprises said mixed spinel structure, M is cobalt, and M' is magnesium.

14. A catalyst as claimed in claim 1, wherein said support comprises said simple spinel structure, and M is cobalt.

15. A catalyst according to claim 14, wherein the silica-alumina contains between 1 and 30 wt % of silica on an anhydrous basis.

16. A catalyst according to claim 15, wherein the silica-alumina contains about 5 wt % silica on an anhydrous basis.

17. A catalyst according to claim 16, prepared by impregnation of cobalt nitrate before and after the calcining step yielding a catalyst containing about 15 wt % cobalt of which about 10 wt % is in the form of cobalt oxide Co$_3$O$_4$.

18. A catalyst according to claim 1, wherein M and M' are distinct metals selected from the group consisting of magnesium, cobalt, nickel, tin, zinc, lithium, calcium, cesium and sodium.

19. A method comprising conducting a Fischer-Tropsch synthesis from a mixture of carbon monoxide and hydrogen, with the catalyst as claimed in claim 12 in a three-phase reactor wherein the catalyst is divided into particles of diameter ranging between 10 microns and 300 microns.

20. A method comprising conducting a Fischer-Tropsch synthesis from a mixture of carbon monoxide and hydrogen, with the catalyst as claimed in claim 13 in a three-phase reactor wherein the catalyst is divided into particles of diameter ranging between 10 microns and 300 microns.

21. A method comprising conducting a Fischer-Tropsch synthesis from a mixture of carbon monoxide and hydrogen, with the catalyst as claimed in claim 14 in a three-phase reactor wherein the catalyst is divided into particles of diameter ranging between 10 microns and 300 microns.

22. A method comprising conducting a Fischer-Tropsch synthesis from a mixture of carbon monoxide and hydrogen, with the catalyst as claimed in claim 1.

23. A method comprising conducting a Fischer-Tropsch synthesis from a mixture of carbon monoxide and hydrogen, with the catalyst as claimed in claim 18 in a three-phase reactor wherein the catalyst is divided into particles of diameter ranging between 10 microns and 300 microns.

24. A method comprising conducting a Fischer-Tropsch synthesis from a mixture of carbon monoxide and hydrogen, with the catalyst as claimed in claim 1 in a three-phase reactor wherein the catalyst is divided into particles of diameter ranging between 10 microns and 300 microns.

25. A method according to claim 24, wherein the catalyst is divided into particles ranging between 20 and 150 microns.

26. A method according to claim 24, wherein the catalyst is divided into particles ranging between 20 and 120 microns.

27. A catalyst comprising:
a support comprising a mixed spinel structure of formula $M_xM'_{(1-x)}Al_2O_4/Al_2O_3.SiO_2$, wherein M is cobalt and M' is magnesium or zinc, the value of index x ranging between 0 and 1 with the values of 0 and 1 being excluded, and $Al_2O_3.SiO_2$ designating a silica-alumina, said support having been calcined in an at least partly oxidizing atmosphere, at a temperature ranging between 850° C. and 900° C., and
an active phase deposited on said support, which contains one or more group VIII metals, selected among cobalt, nickel, ruthenium and iron.

28. A catalyst as claimed in claim 27, wherein M' is magnesium.

29. A catalyst comprising:
a support comprising a simple spinel structure of formula $M_{x(1-x)}Al_2O_4/Al_2O_3.SiO_2$, wherein M is cobalt, the value of index x ranging between 0 and 1 with the values of 0 and 1 being excluded, and $Al_2O_3.SiO_2$ designating a silica-alumina, said support having been calcined in an at least partly oxidizing atmosphere, at a temperature ranging between 850° C. and 900° C., and
an active phase deposited on said support, which contains one or more group VIII metals, selected among cobalt, nickel, ruthenium and iron.

30. A catalyst according to claim 29, wherein the silica-alumina contains between 1 and 30 wt % of silica on an anhydrous basis.

31. A catalyst according to claim 30, wherein the silica-alumina contains about 5 wt % silica on an anhydrous basis.

32. A catalyst according to claim 31, prepared by impregnation of cobalt nitrate before and after the calcining step yielding a catalyst containing about 15 wt % cobalt of which about 10 wt % is in the form of cobalt oxide $Co_3O_4$.

* * * * *

UNITED STATES PATENT AND TRADEMARK OFFICE
CERTIFICATE OF CORRECTION

PATENT NO. : 8,071,655 B2  Page 1 of 1
APPLICATION NO. : 11/721923
DATED : December 6, 2011
INVENTOR(S) : Fabrice Diehl et al.

It is certified that error appears in the above-identified patent and that said Letters Patent is hereby corrected as shown below:

Cover Page, (73) Assignees, third line reads "Rome (IT)" should read --Roma (IT)--.

Column 9, Line 47 reads: "$M_xM'_{(1-x)},Al_2O_4/Al_2O_3.SiO_2$" should read --$M_xM'_{(1-x)}Al_2O_4/Al_2O_3SiO_2$--.

Signed and Sealed this
Twentieth Day of March, 2012

David J. Kappos
*Director of the United States Patent and Trademark Office*